United States Patent [19]

Eckberg et al.

[11] Patent Number: 5,721,290

[45] Date of Patent: Feb. 24, 1998

[54] OXO-ACID MODIFIED EPOXY SILICONE COMPOSITIONS

[75] Inventors: Richard P. Eckberg, Saratoga Springs; Robert F. Agars, Clifton Park, both of N.Y.

[73] Assignee: General Electric Company, Pittsfield, Mass.

[21] Appl. No.: 757,786

[22] Filed: Nov. 26, 1996

[51] Int. Cl.$^6$ .................. C08L 83/06; C08G 77/14; C08F 2/50

[52] U.S. Cl. .................. 522/31; 522/148; 528/26; 528/40

[58] Field of Search .................. 522/31, 148, 170; 528/26, 40, 25

[56] References Cited

U.S. PATENT DOCUMENTS

| | | |
|---|---|---|
| 3,816,282 | 6/1974 | Viventi . |
| 4,256,870 | 3/1981 | Eckberg . |
| 4,279,717 | 7/1981 | Eckberg et al. . |
| 4,310,469 | 1/1982 | Crivello . |
| 4,617,238 | 10/1986 | Crivello et al. . |
| 4,882,201 | 11/1989 | Crivello et al. . |
| 4,977,198 | 12/1990 | Eckberg ............... 522/170 |
| 4,981,881 | 1/1991 | Crivello et al. . |
| 4,987,158 | 1/1991 | Eckberg . |
| 5,034,491 | 7/1991 | Wewers et al. . |
| 5,138,012 | 8/1992 | Riding et al. . |
| 5,144,051 | 9/1992 | Kessel et al. ............... 522/170 |
| 5,178,959 | 1/1993 | Eckberg et al. . |
| 5,227,410 | 7/1993 | Eckberg et al. . |
| 5,240,971 | 8/1993 | Eckberg et al. . |
| 5,258,480 | 11/1993 | Eckberg et al. . |
| 5,360,833 | 11/1994 | Eckberg et al. . |
| 5,364,888 | 11/1994 | Aoki et al. ............... 522/31 |
| 5,369,205 | 11/1994 | Eckberg et al. . |
| 5,650,453 | 7/1997 | Eckberg et al. ............... 522/31 |

FOREIGN PATENT DOCUMENTS

| | | |
|---|---|---|
| 0108208 | 5/1984 | European Pat. Off. . |
| 0 625533 | 11/1994 | European Pat. Off. . |
| WO 9407965 | 4/1994 | WIPO . |

*Primary Examiner*—Susan W. Berman
*Attorney, Agent, or Firm*—Kenneth S. Wheelock

[57] ABSTRACT

Oxo acids having the formula:

$$HOOC(((CH_2)_sO)_t((CH_2)_uO)_vR''$$

where R'' is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive reacted with epoxy functional silicones according to scheme:

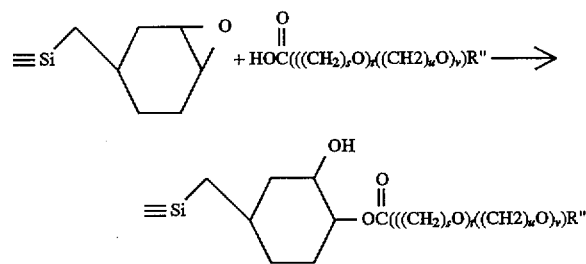

at a molar level that is less than stoichiometric with respect to the epoxy functionality present improve the miscibility of certain photo-catalysts in the epoxy functional silicone.

20 Claims, No Drawings

OXO-ACID MODIFIED EPOXY SILICONE COMPOSITIONS

FIELD OF THE INVENTION

This invention relates to improved ultraviolet light curable silicone release coating compositions. More particularly, it relates to a new epoxy silicone composition modified by the inclusion of oxo acid substituent groups. Such compositions improve the miscibility of the epoxy silicone with photo-catalysts.

BACKGROUND OF THE INVENTION

Silicone compositions have long been used for rendering surfaces non-adherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is an inefficient process as the solvent must thereafter be evaporated. The evaporation of solvent requires large expenditures of energy. Additionally, pollution abatement procedures require that solvent vapors be prevented from escaping into the air. Removal and recovery of all of the solvent entails considerable expenditure for apparatus and energy.

It has been thus noted that there is a need to provide a solventless coating composition that will however remain easy to apply to the substrate. Such solventless coating compositions are sometimes referred to as "100% solids" compositions. The absence of solvent in such compositions lowers the amount of energy required to effect a cure and eliminates the need for expensive pollution abatement equipment. The present invention provides an improved solvent-less pre-crosslinked epoxy functional polydiorganosiloxane fluid that will cure to a non-adherent surface when combined with an effective amount of a soluble diaryl iodonium salt and exposed to ultraviolet radiation.

Epoxy functional silicone release agents are constrained by the need to balance both fast cure and photocatalyst miscibility with a low force or premium release. Good release performance coupled with an efficient photocure response is obtained when the epoxy equivalent weight is held between about 800 and about 1600. If the epoxy group in the epoxy-silicone is derived from 4-vinylcyclohexene oxide (VCHO), then the organofunctional content of the silicone must therefor vary between about 8 and about 16 weight percent. A high epoxy content, one that is above about 16 weight percent in cured epoxy-silicone coatings fails to release properly, while low epoxy content, below about 8 weight percent in cured epoxysilicone coatings results in a slow curing coating that suffers from an additional problem in that the iodonium catalyst tends to rapidly settle out of the silicone fluid upon standing, as the organofunctionality in the silicone tends to assist solubilization of the iodonium salt.

Release coatings are useful for many applications whenever it is necessary to provide a surface or material that is relatively non-adherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar® and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the non-adhesive side of the tape with a silicone release composition that will come into contact with the adhesive as the roll of tape is manufactured.

Silicone release compositions are often sold as dispersions of reactive polysiloxanes in organic solvents such as toluene, or as emulsions in water. A cross-linking catalyst, also known as the curing agent, is then added to the polysiloxane-solvent mixture. The coating compositions is applied to a substrate which is passed through an oven to evaporate the carrier fluid and cure the silicone to an non-adherent or "adhesive" surface. As noted above, this process is quite energy intensive since it requires high oven temperatures to evaporate the solvent and effect the cure at commercially useful speeds.

Use of these solvent based products is becoming increasingly unattractive because of rising energy costs and stringent regulation of solvent emissions into the atmosphere. Other solventless silicone release compositions such as that described in U.S. Pat. No. 4,256,870 herein incorporated by reference have addressed the environmental problem of hydrocarbon emission but still require high oven temperatures for proper cure.

Optimum energy savings as well as necessary ecological considerations are both served by radiation curable compositions. Specifically, an ultraviolet (UV) radiation curable 100% solids silicone release system eliminates the need for high oven temperatures and for expensive solvent recovery systems, and is, therefore, a useful and commercially desirable product.

UV curable silicone compositions are not unknown. A patent issued to R. V. Viventi, U.S. Pat. No. 3,816,282, Jun. 11, 1974, and assigned to the General Electric Company, describes a room temperature vulcanizable silicone composition (RTV) in which a mercaptoalkyl substituent attached to polysiloxanes add to vinyl functional siloxanes in a free-radical process upon UV irradiation in the presence of free-radical type photosensitizers. The particular compositions described by Viventi cure too slowly to be useful for paper release applications. Furthermore, the use of mercaptoalkyl photoreactive substituents gives rise to offensive odors both in product manufacture and in cured materials.

Ultraviolet radiation will initiate free-radical cross-linking in the presence of common photosensitizers which are well-known to persons familiar with the art of radiation curing mechanisms. However, silicone compositions bearing acrylate or other functional groups which undergo free radical polymerization that utilize photosensitizers (such as benzophenone) as a curing agent also require stabilizers (such as hydroquinone) to prevent premature reaction and provide reasonable shelf-life.

Commonly available photosensitizers are only slightly soluble in polydimethylsiloxane fluids which are the basic starting materials for silicone coating compositions. Low solubility of these photosensitizers causes problems in selection of the necessary ingredients. A further difficulty inherent in free-radical systems is oxygen inhibition which necessitates that the coated substrates be under an inert atmosphere while undergoing irradiation in order to cure within a reasonable amount of time. Use of an inert atmosphere adds a complication and an expense to the coating and curing process.

It has previously been discovered that UV curable epoxy functional silicones which are suitable for release coating applications fall into a narrow range of epoxy content and viscosity. The limits to these parameters are imposed by the necessity of coating 0.5 to 2.0 micron layers of these silicone fluids onto various substrates, and by the necessity for these formulations to cure quickly upon exposure to UV radiation and to adhere well to the substrate.

The requirement that these epoxy functional silicones be applied in thin coats dictates that the fluids be of low viscosity such as, for example, approximately 100 to 2,000 centistokes. Consequently, the epoxy functional silicones typically must be low molecular weight fluids. Also, the efficiency of the curing catalyst must be high in order to provide sufficient cross-linking and the formation of a tight, smear-resistant coating which adheres well to the substrate.

The requirement for a highly efficient photo initiator severely restricts the structure of the catalyst since it also must be capable of dissolving or dispersing well in the epoxy functional silicone fluid. U.S. Pat. No. 4,310,469 herein incorporated by reference discloses a UV initiated cationic ring opening curable curing mechanism for dimethyl epoxy chain-stopped linear polydimethylsiloxane fluids utilizing bisaryliodonium salts of the following formula, $[(R'—Ph)_2I]+X-$ wherein $X=AsF_6$, $SbF_6$, $PF_6$ or $BF_4$, and wherein R' is a $C_{(4-20)}$ organo radical selected from alkyl and haloalkyl and mixtures thereof and n is a whole number equal to 1 to 5, inclusive. The catalysts described by Crivello are thick, high viscosity liquids or waxy solids which disperse poorly in the low molecular weight epoxy functional silicones utilized by the present invention. These catalysts exhibit the typical solubility characteristics of diaryliodonium salts, namely, being soluble in polar organic solvents such as chloroform and acetone but insoluble in non-polar organic solvents such as pentane, hexane and petroleum ether. Such solubility behavior severely limits the utility of these salts for initiating the rapid photocuring of epoxy functional silicone paper release compositions.

Although Crivello discloses that R may equal organo radicals selected from alkyl, haloalkyl and branched alkyl groups containing from 4 to 20 carbon atoms, the unique characteristics of "linear alkylate" bis(dodecylphenyl) iodonium salts such as are disclosed by the present invention are not recognized by Crivello. These bis(dodecylphenyl) iodonium salts will rapidly dissolve in the polysiloxane base polymer fluid and disperse throughout, thereby being an efficient photo initiator agent. Such salts are particularly well adapted for use with the novel epoxy functional silicone coating compositions herein provided, as taught in U.S. Pat. No. 4,279,717.

Ultraviolet curable silicone systems based on cyclohexyl-epoxy functionalized polydiorganosiloxane polymers and compatible iodonium photo-catalysts are established commercial products for use in release coating applications. Critical to the performance of these systems is the miscibility of the photo-catalyst. While the use of specific alkylaryl 'onium salts of hypervalent fluoride-containing acids, e.g. $SbF_6-$, $PF_6-$, $BF_4-$ and the like has partially solved the miscibility problem, it remains a problem. Even the preferred bis(dodecylphenyl)iodonium hexafluoroantimonate, is not freely miscible in epoxy silicones having an epoxy equivalent weight greater than about 1,000. Linear epoxy silicones of the general formula $M^E D_x D^E_y M^E$ (y=4, x=60; and y=4, x=90) are only partially miscible with a 50% solution of bis(dodecylphenyl) iodonium hexafluoroantimonate in alkylglycidyl ether with 2 wt. % isopropylthioxanthone present in the iodonium solution.

Epoxy functional silicone paper release coating compositions must ordinarily have epoxy contents of less than approximately 16 weight percent because of the end uses to which such coatings will be put, namely, to serve as non-adherent surfaces capable of releasing aggressive pressure sensitive adhesives. When the epoxy content of the silicone compositions greater than about 16 weight percent, excessive force is required to remove adhesive coated articles from the cured silicone coatings. Note, however, that this may be a useful characteristic whenever it is desirable to selectively control the release characteristics of an adhesive.

Cationic photocurable silicone release coatings are subject to some significant limitations that prevent epoxysilicone release coating from achieving the low, or premium, release associated with thermally curable solventless, emulsion, or solvent borne addition cure silicone release coatings. These limitations are a consequence of the need for a high level of reactivity coupled with photocatalyst compatibility in the photocurable silicone composition which when taken together require a certain minimum level of a polar epoxy functionality in what would otherwise be a nonfunctional polydiorganosiloxane (typically a polydimethylsiloxane).

The use of cycloaliphatic epoxy-functionalized polyorganosiloxanes results in polycycloalkylether crosslinks, e.g. cyclohexene oxide functionalized silicone forming cyclohexyl ether crosslinks. The polycycloalkylether crosslinks resulting from photocuring create high glass transition temperature, high surface energy domains in the photocured epoxysilicone release coating. These high glass transition temperature, high energy domains tightly bind pressure sensitive adhesives that are in contact with them. The polyorganosiloxane component of the photocured epoxysilicone coating has a lower surface energy and thus there is usually a driving force that orients the polyorganosiloxane component of the cured epoxysilicone so that the surface energy (or alternatively the surface free energy) of the photocured epoxysilicone is minimized. However, there is usually sufficient conformational flexibility, even in the photocured crosslinked epoxysilicone, that some of the polycycloalkylether crosslinks either migrate to the surface of the coating or are already present in the surface of the coating. Consequently the low release force surface presented by the polyorganosiloxane components of the polymeric network is interrupted by high release force domains due to the presence at the surface of the polycycloalkylether crosslinks. By comparison to thermal release coatings, a photocured epoxysilicone thus almost always exhibits tighter release force.

This analysis suggests that the release force of photocured epoxysilicones may be decreased by reducing the crosslink density. Typically crosslink density may be reduced in one of two fashions. The first is to limit the amount of epoxy functionality present in the precursor molecules. This approach leads to poor cationic photocatalyst miscibility in the precursor silicone phase and to slow cure rates. The second approach is to increase the average chain length of the molecules. The drawbacks associated with this approach are that as the chain length increases, controlling the average molecular weight and the molecular weight distribution becomes progressively more difficult leading to difficulties in reproducing the polymer synthesis from batch to batch. The higher viscosities associated with the longer chain length require that the more highly polymerized epoxysilicones be blended with lower molecular weight silicones or reactive diluents to permit coating without the use of solvents.

SUMMARY OF THE INVENTION

We now disclose that a silicone comprising the reaction product of component (a), an epoxy silicone selected from the group consisting of $MD_a^E D_b^E Q_c T_d D_e^{Rf} D_g^A D_h^P (D'(CH(R)CH_2O)_j)_k D_1^B M$, $M^E D_a D_b^E Q_c T_d D_e^{Rf} D_g^A D_h^P (D'(CH(R)CH_2O)_j)_k D_1^B M^E$, $M^E D_a D_b^E Q_c T_d D_e^{Rf} D_g^A D_h^P (D'(CH(R)CH_2O)_j)_k D_1^B M$, and mixtures thereof;

where $M = (CH_3)_3 SiO_{1/2}$, $M^E = (C_6H_9O(CH_2)_2)(CH_3)_2 SiO_{1/2}$, $D = (CH_3)_2 SiO_{2/2}$, $D' = ((CH_3)(CH_2)_q)((CH_3)(CH_2)_r) SiO_{2/2}$, $D^E = (C_6H_9O(CH_2)_2)(CH_3) SiO_{2/2}$, $D^{Rf} = (CF_3CH_2CH_2)(CH_3) SiO_{2/2}$, $D^A = ((HO)(C_2H_3COO)C_6H_9(CH_2)_2)(CH_3) SiO_{2/2}$, $D^P = ((HO)(C_6H_4)(CH_2)_2)(CH_3) SiO_{2/2}$, $D^B = ((C_6H_5COO)(HO)(C_6H_9)(CH_2)_2)(CH_3) SiO_{2/2}$, $Q = SiO_{4/2}$, $T = (CH_3)_3 SiO_{3/2}$, where R is selected from the group consisting of hydrogen, methyl, and ethyl, and where a, b, c, d, e, g, h, j, k, and l are positive integers and c, d, g, h, k, l, q and r may be zero or positive integers and wherein said epoxy functional silicone has a viscosity ranging from about 100 to about 100,000 centistokes at 25° C.; and component (b), an oxo-acid having the formula:

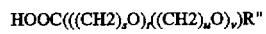

where R" is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive provides improved miscibility for photo-catalysts. The present invention also provides for photo-curable compositions comprising such oxo acid functionalized or modified epoxy silicones, and the cured compositions resulting therefrom.

DETAILED DESCRIPTION OF THE INVENTION

The epoxy functional polydiorganosiloxane fluids provided by the instant invention are more specifically dialkylepoxysiloxy- or trialkylsiloxy chain-stopped polydialkyl-alkylepoxysiloxane copolymers that are partially reacted with compounds commonly called "oxo acids," short chain polyethers with a carboxyl functionality at one or both ends of the polyether molecule, producing thereby a hydroxy, polyether-ester modified epoxy silicone. Such hydroxy, polyether-ester modified epoxy silicones exhibit improved miscibility with the photo-catalysts generally used to polymerize epoxy silicones.

The epoxy functionality is obtained when certain of the hydrogen atoms on the polysiloxane chain of the polydialkyl-alkyl hydrogen-siloxane copolymer are reacted with organic molecules that contain both an ethylenic unsaturation and epoxide functionality; via a hydrosilation addition reaction as taught in U.S. Pat. No. 5,258,480.

The ultraviolet light and/or electron beam curable epoxy-functional silicone fluid can therefor comprise an epoxy-functional dialkyl-epoxysiloxy- or trialkylsiloxy- chain stopped polydialkyl alkylepoxy siloxane copolymer fluid that is the product of sequential hydrosilation reactions involving a polydialkyl-alkyl hydrogen siloxane with a separate polydialkylsiloxane that includes ethylenically unsaturated groups, followed by reaction with an ethylenically unsaturated epoxide monomer wherein the resulting epoxysilicone fluid is diluted with a vinyl ether monomer or oligomer, or an epoxy-functional polyorganosiloxane (or similar epoxysilicone) produced via hydrosilylation of an olefin epoxy compound with silyl hydride containing species.

The alkyl groups of the pre-cross-linked polydialkyl-alkylepoxide siloxane are preferably methyl groups. The ethylenically unsaturated group containing polydialkylsiloxane is preferably a vinyl containing polydialkylsiloxane, most preferably a vinyldimethyl-siloxy- chain stopped polydimethylsiloxane. The ethylenically unsaturated epoxy or epoxide monomer is preferably an unsaturated cycloaliphatic epoxy compound such as 4-vinylcyclohexene oxide (VCHO), vinylnorbornenemonoxide, limonenemonoxide, or dicyclo-pentadienemonoxide.

The hydrosilation reactions used for pre-crosslinking and subsequent functionalization of silylhydride containing polysiloxanes are preferably catalyzed by trace amounts of Group VIII noble metal compounds. By Group VIII noble metals, applicants define the group to consist of the elements ruthenium, rhodium, palladium, osmium, iridium, and platinum.

The vinyl functional silicone employed in the pre-crosslinking network synthesis may be selected from the group consisting of dimethylvinylsiloxy chain stopped polydimethylsiloxane, dimethylvinyl-siloxy chain stopped polydimethyl-methylvinyl siloxane, tetravinyl tetramethylcyclotetrasiloxane, and sym-tetramethyl divinyl-disiloxane.

The hydrogen functional siloxane precursor fluid can be selected from the group consisting of tetrahydrotetramethylcyclotetrasiloxane, dimethylhydrogensiloxy chain stopped polydimethyl-methylhydrogen siloxane, trimethylsiloxy chain stopped polydimethyl-methylhydrogen siloxane, and sym-tetramethyldisiloxane.

We have discovered that when carbinol containing polydiorganosiloxanes are combined with epoxy silicones, the two compositions photo-cure together providing a cross-linked solid silicone polymer that provides lower release force coatings.

Ultraviolet light curable or electron beam curable epoxy-functional silicone compositions of the instant invention may be applied to cellulosic or plastic film substrates including but not limited to supercalendered kraft (SCK) paper, glassine paper, polyethylene kraft (PEK) paper, polyethylene film, polypropylene film, and polyester film. A reaction, initiated by ultraviolet light, cures the liquid silicone release coating to form a solid non-adherent, i.e. abhesive, release surface on the substrate so coated.

Acrylate functional silicones, such as those taught in U.S. Pat. No. 5,034,491 are also photo-curable in the presence of photo-initiators. Photocurable acrylate silicone compositions that are photocurable in the presence of the more common free-radical photo-initiators typically require stabilizers, e.g. hydroquinone. Typical common photo-initiators such as benzophenone and its derivatives are generally completely insoluble in silicone media, as are most stabilizers. Low solubility leads to problems as to an appropriate choice of these necessary additives. Another problem associated with free-radical photocure silicone systems is the cure inhibition brought about by the presence of oxygen, which requires that the coated substrate be under an inert atmosphere such as nitrogen while undergoing ultraviolet radiation for a prompt cure response. While maintaining an inert atmosphere in an ultraviolet or electron beam cure chamber is feasible, the requirement for an inert atmosphere adds complications and expense to a coating and curing process.

It has previously been discovered that ultraviolet and/or electron beam curable epoxy-silicone polymers such as those taught by Eckberg et al. in U.S. Pat. No. 4,279,717 are efficiently cured in the presence of certain compatible onium-type cationic photocure catalysts without being subject to the drawback of being inhibited in the presence of oxygen. These epoxysilicone compositions are constrained within a narrow range of viscosity and epoxy content that is dictated by the need for a defect free coating that is about 0.5 to 2.0 micron thick coating of the polymers that can be applied to the substrate at high application speeds and by the necessity for these photocurable compositions to quickly photocure upon exposure to ultraviolet light while maintaining good adhesion to the substrate.

Three roll offset gravure or multi-roll film splitting application techniques commonly practiced for the high speed coating of solvent free silicones requires that the silicones be in the range of 100 to 3,000 centistokes viscosity at the temperature where applied, rapid cure requires sufficient amount of reactive oxirane be present in the epoxy-silicone molecule to facilitate onium-type catalyst dissolution and to ensure a high reactivity of the system. If too much oxirane is reacted into the silicone fluid composition a photo cured epoxy-silicone composition with the desired release performance will not result.

The epoxy functional silicones comprising the coating composition of the instant invention are selected from the group consisting of $MD_a D^E_b Q_c T_d D^{Rf}_e D^A_g D^P_h (D'(CH(R)CH_2O)_j)_k D^B_l M$, $M^E D_a D^E_b Q_c T_d D^{Rf}_e D^A_g D^P_h (D'(CH(R)CH_2O)_j)_k D^B_l M^E$, $M^E D_a D^E_b Q_c T_d D^{Rf}_e D^A_g D^P_h (D'(CH(R)CH_2O)_j)_k D^B_l M$, and mixtures thereof;

where $M=(CH_3)_3SiO_{1/2}$, $M^E=(C_6H_9O(CH_2)_2)(CH_3)_2SiO_{1/2}$, $D=(CH_3)_2SiO_{2/2}$, $D'=((CH_3)(CH_2)_q)((CH_3)(CH_2)_r)SiO_{2/2}$, $D^E=(C_6H_9O(CH_2)_2)(CH_3)SiO_{2/2}$, $D^{Rf}=(CF_3CH_2CH_2)(CH_3)SiO_{2/2}$, $D^A=((HO)(C_2H_3COO)C_6H_9(CH_2)_2)(CH_3)SiO_{2/2}$, $D^P=((HO)(C_6H_4)(CH_2)_3)(CH_3)SiO_{2/2}$, $D^B=((C_6H_5COO)(HO)(C_6H_9)(CH_2)_2)(CH_3)SiO_{2/2}$, $Q=SiO_{4/2}$, $T=(CH_3)_3SiO_{3/2}$, where R is selected from the group consisting of hydrogen, methyl, and ethyl, and where a, b, c, d, e, g, h, j, k, and l are positive integers and c, d, g, h, k, l, q and r may be zero or positive integers and wherein said epoxy functional silicone has a viscosity ranging from about 100 to about 100,000 centistokes at 25° C. The subscripts on the various components of the epoxyfunctional silicones may be varied at will within the constraints already listed, i.e. either non-zero or optionally zero such that the viscosity is within the defined range. This viscosity can exceed the ability of most coating technology to utilize the high viscosity epoxy functionalized silicone in an undiluted form. Most diluents will have a tendency to lower the cross-link density and cure speed of the cured silicone. Therefore selecting a diluent that lowers the viscosity of the silicone coating composition while essentially maintaining the cross-link density and speed of photo-cure of the cured silicone composition becomes essential to being able to utilize the higher viscosity epoxy functionalized silicones. An additional consideration regarding the choice of diluent is that the curing catalyst must remain miscible with the silicone diluent mixture. Typical diluents slow the cure rate by one of two phenomena, either a dilution effect or an intrinsically slower cure rate; the combination of both effects is undesirable.

We have discovered that organic carboxylic acids react with epoxy functionalized silicones to produce hydroxy ester functionalized silicones without any rupture or attack at the silicone carbon bond functionalized with the epoxy group. Thus, using an oxo acid having the formula:

$$HOOC(((CH2)_sO)_t((CH2)_uO)_v)R''$$

where R" is a monovalent radical selected from the group consisting of hydrogen, one to forty carbon alkyl, alkylene, alkynylene, aromatic, alkylaromatic or carboxylate groups and the subscripts s, t, u and v are zero or positive subject to the limitation that at least s and t or u and v must be positive the following reaction is observed:

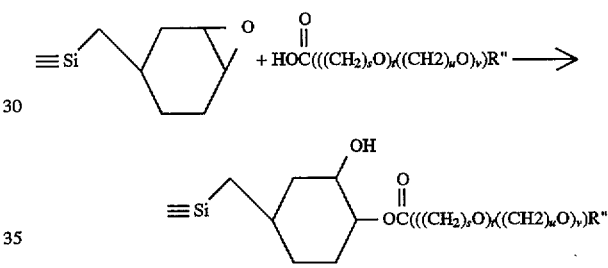

assuming a one to one reaction stoichiometry. Reaction on a one to one stoichiometric basis consumes all the epoxy functionality of the molecule. Therefore it is desirable to only react some of the epoxy functionality, thus preserving to some extent the ability of the epoxy functionalized molecule to undergo photo-polymerization, i.e. the molecule will still photo-cure. Thus since it is desirable to preserve some of the photo-curable epoxy functionality the mole fraction or mole percent of the oxo acid, molar fraction, mole percent or molar equivalent carboxyl, should be less than the mole fraction or mole percent of epoxy groups present that could be reacted.

Partial functionalization of an epoxy functional silicone by an oxo acid of the general formula $HOOC(((CH2)_sO)_t((CH2)_uO)_v)R''$ renders the epoxy functionalized silicone so modified more miscible with photo-catalysts of the general formula $[(R_i'—Ph)_2I]^+X^-$ wherein $X=SbF_6$, $PF_6$ or $BF_4$, i varies from 1 to 5, and wherein R' is a $C_{(4-20)}$organo radical selected from alkyl and haloalkyl and mixtures thereof.

While the stoichiometric subscripts may be zero or positive integers in the case of pure compounds as previously defined, in the context of pure compounds, it is to be noted that mixtures of compounds satisfying these various definitions may also be used, in which case the individual subscripts will necessarily assume a non-integral positive value representative of the average composition of the relevant mixture.

The requirement for a prompt efficient photocure militates that photo initiators and photosensitizers be freely miscible with the photo-crosslinkable compositions in which they are mixed, preferably forming clear solutions, but at least forming stable suspensions or dispersions. In the case of the epoxy-functional photocurable silicones of the instant invention, onium-type cationic photo catalysts must be compatible with the epoxy-silicone fluid. Iodonium salts of the general formula [(R$_i'$—Ph)$_2$I]$^+$X— wherein X=AsF$_6$, SbF$_6$, PF$_6$ or BF$_4$, i varies from 1 to 5, and wherein R' is a C$_{(4-20)}$organo radical selected from alkyl and haloalkyl and mixtures thereof have been designed to address the miscibility issue where R' is typically a mixture of various alkyl fragments derived from linear alkylate grade dodecylbenzene and generically called dodecyl although the mixture is not pure dodecyl. As a consequence of the impurity of the dodecylbenzene, the compounds exhibit a freezing point depression relative to the pure compound and thus tend to exist in a non-crystalline, amorphous, semi-fluid state that is compatible with the epoxy-silicones of the instant invention. These dodecylbenzene iodonium cationic photocure catalysts are thus well-suited for use as photo catalysts for the ultraviolet cured epoxy-silicone release systems. The hexafluoroantimonate salts are most preferred for the compositions of the instant invention because they tend to combine high activity with excellent miscibility.

The UV curable epoxy functional silicone compositions of the present invention can be applied to cellulosic and other substrates including paper, metal, foil, glass, PEK paper, SCK paper, and polyethylene, polypropylene and polyester films. A UV initiated reaction will cure the epoxy functional silicone compositions of the present invention and form a non-adherent, abhesive surface on the coated substrate.

Ultraviolet light curable silicone coating compositions of the present invention are obtained by combining an iodonium salt which is effective for catalyzing an ultraviolet light initiated cure reaction of the silicone coating composition, with a dialkylepoxysiloxy- or trialkylsiloxy- chain-stopped epoxy siloxane fluid having a viscosity of approximately 100 to 100,000 centistokes at 25° C.

The preferred UV-light initiator or photocatalyst utilized by the present invention is a diaryl iodonium salt derived from "linear alkylate" dodecylbenzene. Such salts have the following general formula:

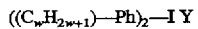

((C$_w$H$_{2w+1}$)—Ph)$_2$—I Y wherein w is an integer varying from about 6 to about 18, Y equals AsF$_6$, SbF$_6$, PF$_6$ or BF$_4$, and Ph stands for a phenyl group. These bis(4-dodecylphenyl) iodonium salts are very effective initiators for the UV cure of a wide range of epoxy functional silicones.

"Linear alkylate" dodecylbenzene is known commercially and is prepared by Friedel-Craft alkylation of benzene with a C$_6$-C$_{14}$ α-olefin cut. Consequently, the alkylate contains a preponderance of branched chain dodecylbenzene, but there may, in fact, be large amounts of other isomers of dodecylbenzene such as ethyldecylbenzene, plus isomer of undecylbenzene, tridecylbenzene and etc. Note, however, that such a mixture is responsible for the dispersive character of the linear alkylate derived catalyst and is an aid in keeping the material fluid. These catalysts are free-flowing viscous fluids at room temperature.

The bis-dodecylphenyl iodonium salts (II) are profoundly different from previously characterized diaryliodonium salts (I). They are both pentane-soluble and water-insoluble. The improvements in solubility and catalytic efficiency of these branched chain substituted salts are further underscored by comparison with analogous salts prepared from straight chain n-tridecylbenzene and n-dodecylbenzene. Two examples of these salts include bis(4-n-tridecylphenyl) iodonium hexafluoroantimonate which have a long linear hydrocarbon chains. These salts (I), in contrast to the new salts (II), are waxy which disperse very poorly in the epoxy functional silicones utilized by the coating compositions of the present invention. These catalysts afford very sluggish UV cures when utilized for release coatings.

Additionally, asymmetric iodonium catalysts may be used as taught in U.S. Pat. No. 4,882,201. A particularly preferred composition is ((4-octyloxyphenyl)phenyl)iodonium hexafluoroantimonate.

The UV curable silicone coating compositions of the present invention utilize epoxy functional silicone fluids which can be prepared in several ways. Epoxy compounds containing both unsaturation and oxirane such as 4-vinylcyclohexeneoxide, react with silylhydride functional polysiloxanes via a hydrosilation reaction. An analogous hydrosilation reaction between vinyl siloxane groups and silylhydride functional polysiloxanes is a well-known means of crosslinking or curing silicone polymers. This reaction may be used to partially cross link silylhydride functional silicones and vinyl functional silicones creating thereby a lightly cross linked network structure. The presence of an initial excess of silylhydride groups relative to the vinyl siloxane reactant creates a polymer with residual silyl hydride groups that may undergo subsequent addition with unsaturated epoxy compounds to produce epoxy functional silicones.

The epoxy functional silicones can be prepared from other vinyl-or allylic-functional epoxy compounds containing olefinic moieties such as allylglycidylether or glycidyl acrylate, vinylnorbornene monoxide and dicyclopentadiene monoxide. Although cyclohexyl epoxy compounds are particularly useful, other vinyl-functional cycloaliphatic epoxy compounds may also be used without significantly altering the properties of the product. The scope of the invention is not limited to the epoxide species used in the examples.

The epoxy functional polysiloxane intermediate fluids can be prepared in any of several ways. The following examples illustrate several of these methods but it must be understood that the present inventions are not limited by these examples. Those skilled in the art will be able to provide other epoxy functional silicone intermediate fluids upon consideration of these examples.

All U.S. patents referenced in this application are hereby and herewith incorporated by reference.

EXAMPLES

Example 1

132.5 g of an epoxysilicone having the general formula M$^E$D$_a$D$^E_b$M$^E$ (epoxy silicone A) having an epoxy equivalent weight of 1325 were weighed into a 500 cc reaction vessel equipped with an overhead stirrer and condenser. Approximately 0.1 mole of reactive cyclohexylepoxy moiety was present in the epoxysilicone. 2.7 g of 3,6-dioxoheptanoic acid (DOHA) (0.02 mole, 20 mole percent relative to the available oxirane) were added. The 3,6-dioxoheptanoic acid was not miscible with the epoxysilicone. Consequently 50 g of a 1:1 weight ratio of a solvent mixture of toluene and methyl ethyl ketone were added to produce a clear, homogeneous solution to assist in the desired reaction. 1.0 g of triethylamine, as a reaction promoter, were added followed by refluxing for fifteen hours at 95° C. The resulting fluid product was clear and colorless following removal of solvent, with a viscosity of 405 centistokes at 25° C. The clarity of the final product was taken as proof that reaction according to the following pathway:

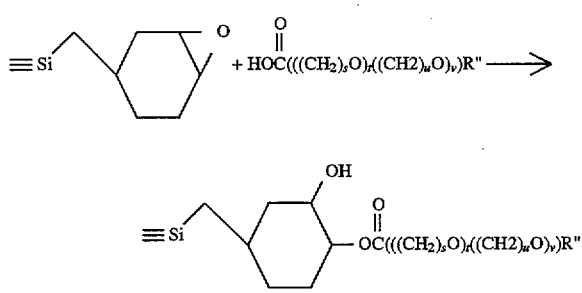

had occurred. Several analogous reactions using both 3,6-dioxoheptanoic acid and 3,6,9-trioxodecanoic acid (TOCA) were carried out with epoxy silicone A. The results of these reactions are summarized in the following table.

TABLE 1

Sub-Stoichiometric reactions of Oxo-Acids with Epoxysilicones

| Experimental Polymer (reaction product of epoxysilicone A and oxo-acid) | Oxo-acid | Mole Percent (relative to oxirane present) | Viscosity, (centistokes at 25° C.) |
|---|---|---|---|
| 1 | DOHA | 50 | 1485 |
| 2 | DOHA | 20 | 405 |
| 3 | DOHA | 10 | 308 |
| 4 | DOHA | 5 | 270 |
| 5 | TOCA | 2.5 | 250 |
| 6 | TOCA | 5 | 274 |

The materials prepared, as listed in table 1, were evaluated for miscibility with a standard photo-catalyst and also for photo-cure response. 100 parts by weight of the experimental polymer was mixed with 3 parts by weight of a catalyst solution. The catalyst solution was 45 weight percent bis(dodecylphenyl)iodonium hexafluoroantimonate, 48 weight percent alkylglycidyl ether (as a reactive diluent), 2 weight percent isopropylthioxanthone (as a sensitizer) and about 5 weight percent of various aromatic hydrocarbons. The appearance and stability over a period of twenty-four hours was observed first and then the combination of maximum conveyor line speed and minimum ultraviolet lamp power necessary to convert 0.5 mil thick coatings to a smear- and migration-free abhesive coating on a polykraft liner was evaluated for a bath containing each experimental polymer. This was determined using an RPC Lab UV Processor. Photo-cure was achieved by exposure to two Hanovia medium pressure mercury vapor lamps mounted in the RPC UV Processor. Lamp output can be independently adjusted to 100, 200 or 300 watts/in. nominal power and the conveyor speed can be adjusted to between 10 and 500 fpm. When optimal curing conditions were observed for each experimental polymer, the ultraviolet flux under optimal curing conditions was measured using an EIT Uvimap™ photometer. Results are reported in Table 2.

TABLE 2

Optimal Photo-cure Conditions for Experimental Polymers

| Experimental Polymer[1] | Appearance | Lamp Power watt/in. | Line Speed fpm | Ultra-violet Flux mJ/cm$^2$ |
|---|---|---|---|---|
| 1 | clear mix, stable | 600 | 400 | 50 |
| 2 | clear mix, stable | 300 | 400 | 25 |
| 3 | clear mix, stable | 300 | 400 | 25 |
| 4 | slightly hazy, stable | 300 | 400 | 25 |
| 5 | very hazy, unstable | 300 | 400 | 25 |
| 6 | clear mix, stable | 300 | 400 | 25 |
| Epoxy-silicone A (control) | very hazy, unstable | 300 | 500 | 20 |

Notes to Table:
unstable indicates that the iodonium photo-catalyst separated out from suspension within a twenty-four hour period.
[1] reaction product of epoxysilicone A and oxo-acid These results demonstrate that there is very little loss of photo-cure response resulting from polyether modification of an epoxysilicone by reaction with an oxo-acid.

The release performance of cured coatings was then evaluated. A comparison was made between experimental polymer 2 and epoxysilicone A by dissolving 2 parts by weight of the iodonium catalyst solution previously described and 100 parts by weight of the two photo-curable polymers. These two mixtures were then coated onto polyethylene kraft paper to a coatweight of 1 g/m$^2$ and cured by exposure to 400 watt/in. Ultraviolet lamp power at a line speed of 100 fpm. TESA acrylic test tape was applied to each cured silicone coating and aged for 20 hours at 70° C. and the release force measured at 50 ipm. Cured epoxysilicone A yielded a release force of 60 g/in. compared to the experimental polymer 2 which had a release force of 40 g/in.

Example 2

Preparations of experimental polymers analogous to polymer 6 using an epoxysilicone of lower epoxy equivalent weight (higher epoxy content); epoxysilicone B, epoxy equivalent weight 1100, were performed with two different levels of 3,6,9-trioxodecanoic acid, 5 mole percent and 3 mole percent (based on the available oxirane level in the epoxysilicone B). Polymer 7 is the reaction product at the 5 mole percent level and polymer 8 is the reaction product at the 3 mole percent level. These preparations were evaluated as in example 1.

TABLE 3

Optimal Photo-cure Conditions for Experimental Polymers

| Experimental Polymer[1] | Appearance | Lamp Power watt/in. | Line Speed fpm | Ultra-violet Flux mJ/cm$^2$ |
|---|---|---|---|---|
| 7 | clear mix, stable | 300 | 400 | 25 |
| 8 | clear mix, stable | 300 | 500 | 20 |

TABLE 3-continued

Optimal Photo-cure Conditions for Experimental Polymers

| Experimental Polymer[1] | Appearance | Lamp Power watt/in. | Line Speed fpm | Ultra-violet Flux mJ/cm² |
|---|---|---|---|---|
| epoxysilicone B (control) | hazy mix, unstable | 300 | 500 | 20 |

Note to Table: unstable indicates that the iodonium photo-catalyst separated out from suspension within a twenty-four hour period.
[1] reaction product of expoxysilicone B and oxo-acid The higher epoxy content of epoxysilicone B allows achievement of photo-catalyst miscibility with lower levels of oxo-acid modification of the epoxysilicone.

Blends of experimental polymer 7 and 8 with long chain linear polydimethylsiloxane chainstopped with photo-reactive functional groups were prepared. 100 parts by weight of each mixture was blended with 2 parts by weight of the photo-catalyst solution previously described.

TABLE 4

Blends of Experimental Polymers

| Experimental Polymer Mix, (parts by weight) | Appearance | Lamp Power watt/in. | Ultra-violet Line Speed fpm | Flux mJ/cm² |
|---|---|---|---|---|
| 7 parts polymer 7 + 1 part H | clear, stable | 300 | 400 | 25 |
| 9 parts polymer 7 + 1 part F | clear, stable | 400 | 400 | 33 |
| 9 parts polymer 7 + 1 part E | clear, stable | 400 | 400 | 33 |
| 7 parts polymer 8 + 1 part H | clear, stable | 300 | 400 | 25 |
| 9 parts polymer 8 + 1 part G | clear, stable | 400 | 400 | 33 |
| 9 parts polymer 8 + 1 part G | clear, stable | 600 | 400 | 50 |

E is $M^cD_{115}M^c$ where $M^c$ has the following structure:

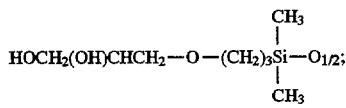

F is $M^ED_{80}M^E$; G is $M^ED_{119}M^E$; and H is the reaction product of 10 parts of $MD^H_4D^{15}M$ with 8 parts $M^{vi}D_{150}M^{vi}$ and 2.5 parts vinyl cyclohexeneoxide where M is trimethyl siloxyl, D is dimethylsiloxyl, $D^H$ is hydrogen methylsiloxyl and $M^{vi}$ is vinyl dimethylsiloxyL The following blends were evaluated in paper release coating compositions.

TABLE 5

Photo-curable Blends with experimental Epoxysilicone Polymers

| MIX | First Polymer | Parts by Weight of First Polymer | Second Polymer | Parts by Weight Second Polymer |
|---|---|---|---|---|
| I. | epoxysilicone B | 100 | na | 0 |
| II. | polymer 8 | 100 | na | 0 |
| III. | epoxysilicone B | 95 | G p 24 | 5 |
| IV. | polymer 8 | 95 | G | 5 |
| V. | epoxysilicone B | 90 | G | 10 |
| VI. | polymer 8 | 90 | G | 10 |

As previously described 100 parts by weight of each of these mixtures as described in Table 5 were mixed with 2 parts by weight of the photo-catalyst solution previously described and coated onto polyethylene kraft liner at 50 fpm using a three roll offset Dixon coater with coating weights ranging from about 1..1–1.3 g/m². The coatings were cured by exposure to two 300 watt Fusion H UV lamps. Ashland 1085 laminates were prepared by laminating with Ashland 1085 solvent borne acrylic pressure sensitive adhesive (PSA), then facestock was applied to the cured PSA. The release force required to separate the PEK/silicone laminate from the PSA/facestock laminate was measured by cutting the laminates into 2 inch wide strips and measuring the force required for separation at a strip speed of 400 in./min. after aging the laminates for a day at ambient conditions. After aging for twenty-four hours at room temperature the release force was determined for the various photo-cured mixtures.

TABLE 6

Release Force Measurements of Photo-cured Experimental Epoxysilicones

| | Strip Speed | | | | |
|---|---|---|---|---|---|
| MIX | 0.05 m/s | 0.17 m/s | 0.50 m/s | 1.00 m/s | 3.00 m/s |
| I. | 29 g/2 in. | 34 g/2 in. | 44 g/2 in. | 43 g/2 in. | 45 g/2 in. |
| II. | 24 g/2 in. | 29 g/2 in. | 34 g/2 in. | 37 g/2 in. | 44 g/2 in. |
| III. | 22 g/2 in. | 30 g/2 in. | 30 g/2 in. | 33 g/2 in. | 36 g/2 in. |
| IV. | 15 g/2 in. | 26 g/2 in. | 29 g/2 in. | 34 g/2 in. | 38 g/2 in. |
| V. | 19 g/2 in. | 28 g/2 in. | 30 g/2 in. | 32 g/2 in. | 40 g/2 in. |
| VI. | 18 g/2 in. | 28 g/2 in. | 30 g/2 in. | 32 g/2 in. | 40 g/2 in. |

Having described the invention that which is claimed is:
1. A silicone comprising the reaction product of component (a),
an epoxy silicone selected from the group consisting of
$MD_aD^E_bQ_cT_dD^{Rf}_eD^A_gD^P_h(D'(CH(R)CH_2O)_j)_kD^B_1M$,
$M^ED_aD^E_bQ_cT_dD^{Rf}_eD^A_gD^P_h(D'(CH(R)CH_2O)_j)_k D^B_1M^E$,
$M^ED_aD^E_bQ_cT_dD^{Rf}_eD^A_gD^P_h(D'(CH(R)CH_2O)_j)_kD^B_1M$,
and mixtures thereof;
where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_q)((CH_3)(CH_2)_r)SiO_{2/2}$,
$D^E=(C_6H_9O(CH_2)_2)(CH_3)SiO_{2/2}$,
$D^R=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2))(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where a, b, c, d, e, g, h, j, k, and l are positive integers and c, d, g, h, k, l, q and r may be zero or positive integers and wherein said epoxy functional silicone has a viscosity ranging from about 100 to about 100,000 centistokes at 25° C.; and component (b), an oxo-acid having the formula:

HOOC(((CH2)$_s$O)$_t$((CH2)$_u$O)$_v$)R"

where R" is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive.

2. The silicone of claim 1 where the epoxy molar quantity of component (a) exceeds the carboxyl molar quantity of component (b).

3. The silicone of claim 2 where the subscripts u and v are zero.

4. The silicone of claim 3 where R" is methyl.

5. The silicone of claim 4 where the subscript s is 2 and the subscript t is 2.

6. The silicone of claim 4 where the subscript s is 2 and the subscript t is 3.

7. A photo-curable silicone composition comprising
i) the reaction product of component (a), an epoxy silicone selected from the group consisting of
MD$_a$D$^E_b$Q$_c$T$_d$D$^{Rf}_e$D$^A_g$D$^P_h$(D'(CH(R)CH$_2$O)$_j$)$_k$D$^B_1$M,
M$^E$D$_a$D$^E_b$Q$_c$T$_d$D$^{Rf}_e$D$^A_g$D$^P_h$(D'(CH(R)CH$_2$O)$_j$)$_k$D$^B_1$M$^E$,
M$^E$D$_a$D$^E_b$Q$_c$T$_d$D$^{Rf}_e$D$^A_g$D$^P_h$(D'(CH(R)CH$_2$O)$_j$)$_k$D$^B_1$M,
and mixtures thereof;

where
M=(CH$_3$)$_3$SiO$_{1/2}$,
M$^E$=(C$_6$H$_9$O(CH$_2$)$_2$)(CH$_3$)$_2$SiO$_{1/2}$,
D=(CH$_3$)$_2$SiO$_{2/2}$,
D'=((CH$_3$)(CH$_2$)$_q$)((CH$_3$)(CH$_2$)$_r$)SiO$_{2/2}$,
D$^E$=(C$_6$H$_9$O(CH$_2$)$_2$)(CH$_3$)SiO$_{2/2}$,
D$^R_f$=(CF$_3$CH$_2$CH$_2$)(CH$_3$)SiO$_{2/2}$,
D$^A$=((HO)(C$_2$H$_3$COO)C$_6$H$_9$(CH$_2$)$_2$)(CH$_3$)SiO$_{2/2}$,
D$^P$=((HO)(C$_6$H$_4$)(CH$_2$)$_3$)(CH$_3$)SiO$_{2/2}$,
D$^B$=((C$_6$H$_5$COO)(HO)(C$_6$H$_9$)(CH$_2$)$_2$)(CH$_3$)SiO$_{2/2}$,
Q=SiO$_{4/2}$,
T=(CH$_3$)$_3$SiO$_{3/2}$, where R is selected from the group consisting of hydrogen, methyl, and ethyl, and where a, b, c, d, e, g, h, b k, and l are positive integers and c, d, g, h, k, l, q and r may be zero or positive integers and wherein said epoxy functional silicone has a viscosity ranging from about 100 to about 100,000 centistokes at 25° C.; and component (b), an oxo-acid having the formula:

HOOC(((CH2)$_s$O)$_t$((CH2)$_u$O)$_v$)R"

where R" is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive; and ii) a photo-catalyst.

8. The composition of claim 7 wherein said photo-catalyst has the formula:

((R$_i$'—Ph)$_2$I)$^+$X— wherein X=AsF$_6$, SbF$_6$, PF$_6$ or BF$_4$, i varies from 1 to 5, and wherein R' is a monovalent alkyl or haloalkyl radical having from about 4 to about 20 carbon atoms.

9. The composition of claim 8 wherein said photo-catalyst is bis(dodecylphenyl)iodonium hexafluoroantimonate.

10. The composition of claim 7 wherein said photo-catalyst is ((4-octyloxyphenyl)phenyl)iodonium hexafluoroantimonate.

11. The composition of claim 8 where the epoxy molar quantity of component (a) exceeds the carboxyl molar quantity of component (b).

12. The composition of claim 11 where the subscripts u and v are zero.

13. The composition of claim 12 where R" is methyl.

14. The composition of claim 13 where the subscript s is 2 and the subscript t is 2.

15. The composition of claim 13 where the subscript s is 2 and the subscript t is 3.

16. A photo-curable silicone composition comprising
i) the reaction product of component (a), an epoxy silicone selected from the group consisting of
MD$_a$D$^E_b$Q$_c$T$_d$D$^{Rf}_e$D$^A_g$D$^P_h$(D'(CH(R)CH$_2$O)$_j$)$_k$D$^B_1$M,
M$^E$D$_a$D$^E_b$Q$_c$T$_d$D$^{Rf}_e$D$^A_g$D$^P_h$(D'(CH(R)CH$_2$O)$_j$)$_k$D$^B_1$M$^E$,
M$^E$D$_a$D$^E_b$Q$_c$T$_d$D$^{Rf}_e$D$^A_g$D$^P_h$(D'(CH(R)CH$_2$O)$_j$)$_k$D$^B_1$M,
and mixtures thereof;

where
M=(CH$_3$)$_3$SiO$_{1/2}$,
M$^E$=(C$_6$H$_9$O(CH$_2$)$_2$)(CH$_3$)$_2$SiO$_{1/2}$,
D=(CH$_3$)$_2$SiO$_{2/2}$,
D'=((CH$_3$)(CH$_2$)$_q$)((CH$_3$)(CH$_2$)$_r$)SiO$_{2/2}$,
D$^E$=(C$_6$H$_9$O(CH$_2$)$_2$)(CH$_3$)SiO$_{2/2}$,
D$^R_f$=(CF$_3$CH$_2$CH$_2$)(CH$_3$)SiO$_{2/2}$,
D$^A$=((HO)(C$_2$H$_3$COO)C$_6$H$_9$(CH$_2$)$_2$)(CH$_3$)SiO$_{2/2}$,
D$^P$=((HO)(C$_6$H$_4$)(CH$_2$)$_3$)(CH$_3$)SiO$_{2/2}$,
D$^B$=((C$_6$H$_5$COO)(HO)(C$_6$H$_9$)(CH$_2$)$_2$)(CH$_3$)SiO$_{2/2}$,
Q=SiO$_{4/2}$,
T=(CH$_3$)$_3$SiO$_{3/2}$, where R is selected from the group consisting of hydrogen, methyl, and ethyl, and where a, b, c, d, e, g, h, b k, and l are positive integers and c, d, g, h, k, l, q and r may be zero or positive integers and wherein said epoxy functional silicone has a viscosity ranging from about 100 to about 100,000 centistokes at 25° C.; and component (b), an oxo-acid having the formula:

HOOC(((CH2)$_s$O)$_t$((CH2)$_u$O)$_v$)R"

where R" is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive; and ii) a photo-catalyst.

17. The composition of claim 16 wherein said photo-catalyst has the formula:

((R$_i$'—Ph)$_2$I)$^+$X— wherein X=AsF$_6$, SbF$_6$, PF$_6$ or BF$_4$, i varies from 1 to 5, and wherein R' is a monovalent alkyl or haloalkyl radical having from about 4 to about 20 carbon atoms.

18. The composition of claim 17 where the subscripts u and v are zero, the subscript s is 2, the subscript t is 2 and R" is methyl.

19. The composition of claim 17 where the subscripts u and v are zero, the subscript s is 2, the subscript t is 3 and R" is methyl.

20. A silicone consisting essentially of the reaction product of component (a), an epoxy silicone selected from the group consisting of $MD_aD^E{}_bQ_cT_dD^{Rf}{}_eD^A{}_gD^P{}_h(D'(CH(R)CH_2O)_j)_kD^B{}_1M$,
$M^ED_aD^E{}_bQ_cT_dD^{Rf}{}_eD^A{}_gD^P{}_h(D'(CH(R)CH_2O)_j)_k D^B{}_1M^E$,
$M^ED_aD^E{}_bQ_cT_dD^{Rf}{}_eD^A{}_gD^P{}_h(D'(CH(R)CH_2O)_j)_kD^B{}_1M$, and mixtures thereof;

where $M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_q)((CH_3)(CH_2)_r)SiO_{2/2}$,
$D^E=(C_6H_9O(CH_2)_2)(CH_3)SiO_{2/2}$,
$D^R=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where a, b, c, d, e, g, h, j, k, and l are positive integers and c, d, g, h, k, l, q and r may be zero or positive integers and wherein said epoxy functional silicone has a viscosity ranging from about 100 to about 100,000 centistokes at 25° C.; and component (b), an oxo-acid having the formula:

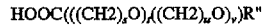

$HOOC(((CH2)_sO)_t((CH2)_uO)_v)R"$ where R" is a monovalent radical selected from the group consisting of hydrogen, one to forty carbon alkyl, alkylene, alkynylene, aromatic, alkylaromatic or carboxyl groups and the subscripts s, t, u and v are zero or positive subject to the limitation that at least s and t or u and v must be positive.

* * * * *